United States Patent [19]
Godel et al.

[11] 3,937,966
[45] Feb. 10, 1976

[54] ACCELERATOR BEAM PROFILE ANALYZER

[75] Inventors: Julius B. Godel, Bayport, N.Y.; Marcel Guillaume, Grivegnee, Belgium; Richard M. Lambrecht, East Quogue; Ronald Withnell, East Setauket, both of N.Y.

[73] Assignee: The United States of America as represented by the United States Energy Research and Development Administration, Washington, D.C.

[22] Filed: Feb. 19, 1975

[21] Appl. No.: 551,200

[52] U.S. Cl. ............... 250/393; 250/283; 250/493; 250/336
[51] Int. Cl.² .......................................... G01T 1/16
[58] Field of Search ........... 250/283, 492, 281, 282, 250/492 A, 492 B, 493, 496, 498, 250/501, 503, 393, 336

[56]  References Cited
UNITED STATES PATENTS

| 2,613,324 | 10/1952 | Perkings et al. ................. 250/283 |
| 2,781,452 | 2/1957  | Loggren et al. .................. 250/281 |
| 3,113,214 | 12/1963 | Furnas, Jr. ...................... 250/493 |

Primary Examiner—Eli Lieberman
Assistant Examiner—Tommy P. Chin
Attorney, Agent, or Firm—Dean E. Carlson; Leonard Belkin

[57] ABSTRACT

A beam profile analyzer employing sector or quadrant plates each servo controlled to outline the edge of a beam.

5 Claims, 1 Drawing Figure

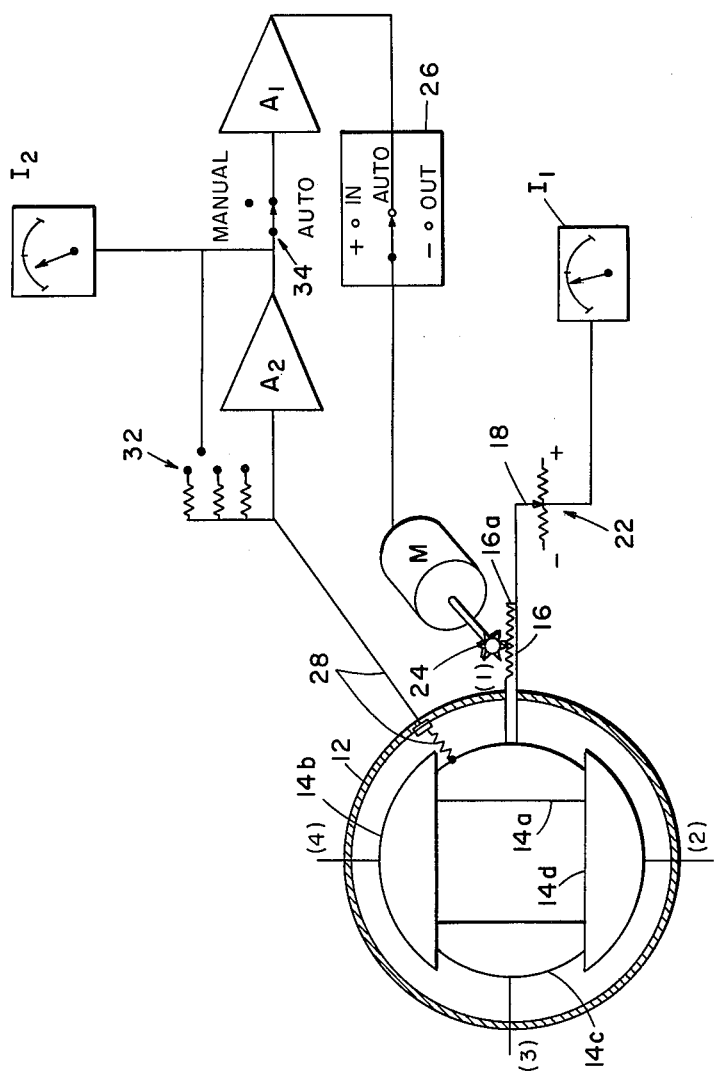

ACCELERATOR BEAM PROFILE ANALYZER

The invention described herein was made in the course of, or under a contract with the U.S. Atomic Energy Commission.

BACKGROUND OF THE INVENTION

Particle accelerators and cyclotrons have become the best tools for producing short-lived radionuclides and labelled compounds. The rapid growth of nuclear medicine in the advanced countries has quickly required a wider range of isotopes with favorable medical characteristics: short half-life, decay scheme by $\gamma$ emission, high activity of carrier-free produced isotopes, all of which are more readily capable of being produced in such devices.

Preparation of such isotopes in an accelerator involves bombarding a target with the beam. It has developed that the production of specific isotopes not only involves the use of specific targets and specific beam energies, but in addition, specific beam dimensions. For example, in certain applications a highly focussed beam is required while in other applications a defocussed beam is desired. A variety of beam cross-section configurations may also be necessary in other situations.

Heretofore, beam configuration in an accelerator has been monitored in several ways. In one arrangement, plates may be inserted to block the beam and thereby obtain a picture of its cross-section. Of necessity this is only a sampling arrangement for use at spaced intervals and does give continuous results. A commercially available device which is used for this purpose employs a thin wire matrix, but this device is generally limited to beam intensities in the $10^{-3}$ to $10^{-2}$ microampere range. The preparation of radionuclides for medical application quite often involves beams of much higher intensities. Also, these so-called beam analyzers now available tend to be quite expensive.

SUMMARY OF THE INVENTION

The present invention overcomes many of the disadvantages of prior beam analyzers by providing for the continuous, non-interfacing determination of beam shape capable of being employed with beams of great intensity.

In accordance with a preferred embodiment of this invention, there is provided apparatus for defining the edges of a beam of sub-atomic charged particles along an axis transverse to the directional axis of said beam utilizing a pair of independently movable target members, means to measure current flow out of the target members caused by impingement thereon by said beam, and means for moving each of the target members until the current reached for each target member is a predetermined value thereby defining the width of the beam along the transverse axis. If desired or required, additional independently movable target members may be employed to define the beam width along any axis transverse to the directional axis.

It is therefore a principal object of this invention to provide apparatus for defining the transverse shape of a beam of charged sub-atomic particles.

Other objects and advantages of this invention will hereinafter become obvious from the following description of a preferred embodiment of this invention.

BRIEF DESCRIPTION OF THE DRAWING

The FIGURE shows schematically a preferred embodiment of this invention.

DESCRIPTION OF THE PREFERRED EMBODIMENT

Referring to the FIGURE, there is shown in cross-section evacuated beam tube 12 of an accelerator (not shown). Within tube 12 there are four quadrant plates 14a, 14b, 14c, and 14d all of which are mounted to permit movement in the manner to be described below. Preferably, immediately adjacent plates would be in different planes perpendicular to or at right angles to the axis of tube 12 so that movement of each of the quadrant plates would not interfere with the remaining plates.

Each quadrant plate is provided with its own system for positioning same, and all the systems would be identical so that there is shown and described now only the system for positioning quadrant plate 14a.

Attached to quadrant plate 14a at one end is a shaft 16 having a rack 16a and vacuum sealed where it penetrates the wall of tube 12. The opposite end of shaft 16 is connected to the wiper 18 of a potentiometer 22 which is connected in turn to a meter $I_1$ calibrated to show the position of quadrant plate 14a along its axis of movement within beam tube 12.

Rack 16 is positioned by a pinion 24 actuated by a servo motor M which is energized by a servo amplifier $A_1$ through a three way switching device 26. The latter, as shown by the three switching positions shown, can be employed to manually control servo motor M to move quadrant plate 14a either in or out, or permit automatic control by servo amplifier $A_1$.

Current flow from quadrant plate 14a is by way of electrical lead 28 to an electrometer amplifier $A_2$ having a sensitivity control resistor bank 32. Output of amplifier $A_2$ goes to servo amplifier $A_1$ through a two position switch 34 permitting either automatic or manual control of servo motor M. When manual control is desired, the manual switch position prevents current flow to amplifier $A_1$, and switching device 26 is operated in the IN or OUT positions to drive the quadrant plate in the appropriate direction. A beam current meter $I_2$ shows current flow out of quadrant plate 14a. Amplifiers $A_1$ and $A_2$, the various instruments, and other devices making up the system just described are all well known in the art, are available commercially, and are provided with conventional power sources (not shown).

Quadrant plates 14a–14d may be constructed from any suitable material which will block the beam and conduct current flow. A suitable material has been found to be tungsten for use with a proton beam. This material has a high melting temperature and does not become appreciably radioactive upon being hit by the beam in a way which would produce undesirable secondary emissions.

In the operation of the apparatus just described, a beam such as a proton beam is present in tube 12. Quadrant plates 14a–14b are initially in their maximum open position as illustrated. Switch device 26 and switch 34 are placed in their automatic operation modes. Servo amplifier $A_1$ will produce an error signal moving quadrant plate 14a inwardly until current flow out of quadrant plate 14a by way of lead 28 cancels the error signal. The servo loop would be calibrated as is understood in the art to bring quadrant plate 14a to a stabilized position where current flow is at some predetermined level. Each servo loop for each of the quadrant plates 14a-14d can be operated one at a time or altogether. In this automatic mode, the quadrant plates will automatically and continuously be moved to delineate the outer edges of the beam and if desired meter $I_1$ can be connected to a pen and ink recorder (not shown) to show a history of the beam shape and size. If desired, the servo loop or loops can be manually operated using the manual mode positions in switch device 26 and switch 34, using current meter $I_2$ to indicate when the edge of the beam is delineated.

The apparatus just described not only does not interfere with beam operation but also provides a continuous and accurate determination of the beam shape and size, and if desired additional quadrant plates may be employed for a more accurate record of beam shape, and by the same token, if there is interest only in one edge of the beam only one quadrant plate may be utilized. Furthermore, the system is easy and convenient to make and operate, is quite inexpensive when compared to commercially available devices, and furthermore, either the automatic or manual modes of operation may be selected.

What is claimed is:

1. Apparatus for defining edges of a beam of subatomic particles along axes transverse to the directional axis of said beam comprising:
    a. multiple quadrant plate means independently movable along each of said transverse axes;
    b. means for measuring current flowing out of each of said plate means caused by impingement of said beam on each of said plate means; and
    c. means for moving each of said plate means along each said transverse axis until current flow reaches predetermined values indicating a predetermined point on the outer edges of said beam along said transverse axes thereby defining the extent of said beam along said transverse axes.

2. The apparatus of claim 1 in which adjacent plate means are located in transverse axes in different planes to permit free movement of said plate means.

3. The apparatus of claim 2 in which said means for moving each of said plate means includes an automatically functioning servo system for moving its plate means to a point on its transverse axis where current flow is at a predetermined value.

4. The apparatus of claim 3 having means for bypassing the servo system and adjusting said plate means under manual control.

5. The apparatus of claim 4 in which each plate means has its own and completely independent moving means.

* * * * *